Jan. 18, 1966   E. RODER   3,229,864
CHECK VALVE WITH RESILIENT MOVABLE ELEMENT
AND DISPENSING PUMP EMBODYING THE SAME
Filed Nov. 30, 1964
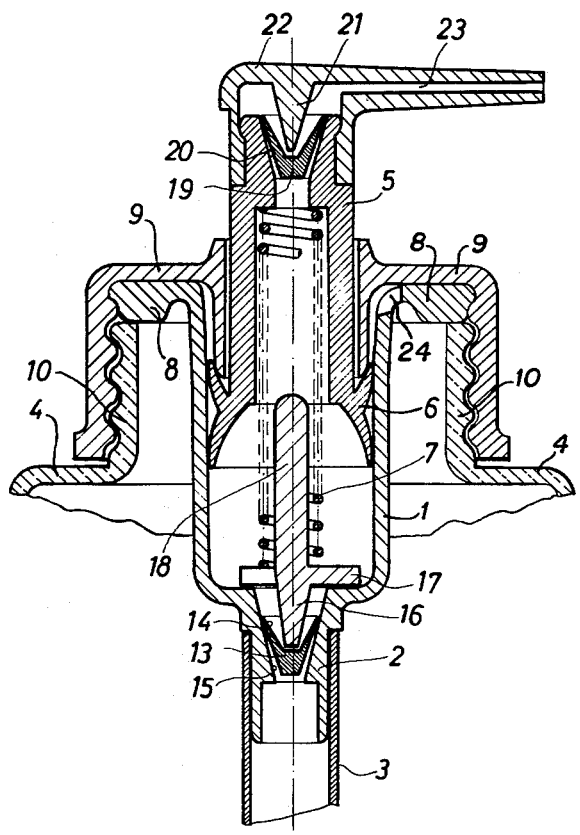
INVENTOR:
EBERHARD RODER
By
E. M. Squire
HIS ATTY.

United States Patent Office 3,229,864
Patented Jan. 18, 1966

3,229,864
CHECK VALVE WITH RESILIENT MOVABLE ELEMENT AND DISPENSING PUMP EMBODYING THE SAME
Eberhard Roder, 4 Paulstrasse, Lubeck, Germany
Filed Nov. 30, 1964, Ser. No. 414,549
Claims priority, application Germany, Nov. 30, 1963, R 36,689
4 Claims. (Cl. 222—321)

The present invention relates to a check valve formed of plastic material and to a piston pump, likewise formed of plastic material, which embodies such check valves.

The check valve utilizes the inherent resiliency of the plastic material to obtain a satisfactory seal notwithstanding dimensional inaccuracies and surface irregularities at the cooperating portions of the valve seat and the movable valve element.

It is known in larger pumps which are made of metal, to provide a frusto-conical body as a movable valve element which sealingly engages against a correspondingly shaped conical valve seat. This requires that the valve seat and the movable valve element must be fitted together by precision grinding. The use of such expensive precision fitted valves for small dispensing pumps formed of thermoplastic material is impractical, since such pumps are usually discarded along with the container after it has been emptied by the pump, and therefore the cost of manufacture must be minimized.

The invention solves this problem in such a manner that, for valves of small pumps of the above mentioned type, a movable valve element formed of resilient thermoplastic material is provided having the shape of a hollow truncated cone open at its larger base and a wall tapering convergently towards the open base, the valve seat having a correspondingly directed conical surface the apex angle of which is somewhat smaller than that of the valve body.

By means of this configuration of the movable valve element, its free elastic circumferential edge is sealingly urged against the valve seat surface. Neither the movable valve element nor the valve seat require any machining operations, and both parts may also deviate from precise circular shape as is always the case in manufacturing parts of molded or pressed thermoplastic material. In spite of this a satisfactory sealing action is obtained.

The invention is described in greater detail in the following specification with reference to the accompanying drawing forming a part hereof.

In the drawing, the single figure is an elevational view in axial section showing a dispensing pump embodying the invention in association with a threaded cap closing the top of a glass bottle.

In the drawing a small piston type pump is dispensing pump is arranged to discharge small amounts of paste, or to spray small amounts of liquid out of a container comprising a pump cylinder 1 made of thermoplastic material and having a lower extension 2 upon which a suction tube 3 of thermoplastic material is secured. The tube extends down substantially to the bottom (not shown) of a container 4 which is illustratively shown as a glass bottle. A tubular piston 5 of thermoplastic material is slidably arranged for reciprocation within the cylinder and is operable from the outside. The piston 5 has a sealing collar 6 formed thereon bearing against the inner wall of the cylinder 1 and the piston 5 is yieldingly urged by a spring 7 upwardly into its position of rest. The pump cylinder 1 has a radial flange 8 which is clamped by an interiorly threaded cap 9 against the upper edge or mouth of a threaded neck 10 of the bottle 4.

According to the invention the bottom check valve of the cylinder 1 consists of a movable valve element 13 formed of thermoplastic material and having the form of a hollow truncated cone open at its larger base, and having a circumferential wall 14 tapering convergently towards the open base. The valve seat 15 has a correspondingly directed frusto-conical surface but having an apex angle which is somewhat smaller than that of the movable valve element 13. An axial pin 16, forming a part of a spider 17 supported on the bottom of the cylinder 1, extends downwardly into the hollow valve element. The spider 17 also comprises an upwardly extending guide pin 18 for the piston spring 7. The lower end of spring 7 bears against the spider 17 and with its upper end bears against the pump piston. The pin 16 limits the axial movement of the movable valve element 13 and also prevents tilting of the element 13 which inherently has a very little weight.

A similar check movable valve including a valve element 19 and a valve seat 20 is provided at the top of the piston 5. A limit and guide pin 21 of a closure 22 attached to the top end of the tubular piston 5 extends downwardly into the hollow valve element 19, the closure 22 being provided with an outlet channel 23 for discharging the fluid contents of the container, or with a spray nozzle (not shown) for spraying a liquid. When the piston 5 is pushed downwardly, air may enter the bottle 4 through an orifice 24.

All parts of the pump consist of pressed or molded thermoplastic material. However, the spring 7 may be made of metal.

While I have shown and described what I believe to be the best embodiment of my invention, it will be apparent to those skilled in the art that various changes and modifications may be made thereon without departing from the spirit and scope of the invention as defined in the appended claims.

What I claim is:

1. A valve for pumps having a piston reciprocable within a cylinder for discharging small amounts of fluid from a container, characterized in that a movable valve element formed of resilient material is provided, said element having the shape of a hollow truncated cone open at its larger base, and a wall tapering convergently towards the open base, and a cooperating valve seat having a correspondingly directed conical surface the apex angle of which is smaller than that of the valve element.

2. A check valve comprising: a movable valve element formed of resilient material, said element being shaped as a hollow truncated cone open at its larger base with a wall which tapers convergently toward said open base; a cooperating valve seat having a correspondingly directed conical surface the apex angle of which is smaller than that of said element; and means for limiting movement of said element outwardly of said seat.

3. A check valve according to claim 2, wherein said element and said conical surface have inherent dimensional inaccuracies and surface irregularities, the resiliency of said element causing positive sealing engagement between said element and said seat.

4. A dispensing pump, comprising: a closure member for a container from which a fluid is to be dispensed; a pump cylinder mounted in said closure member; a piston vertically reciprocable within said cylinder; a first valve seat at the top of said piston; a second valve seat at the bottom of said cylinder; a separate movable valve element cooperating with each of said valve seats, each element being shaped as a hollow truncated cone open at its larger base with a wall which tapers convergently toward said open base, each of said valve seats having a correspondingly directed conical surface for engagement by its associated element, the apex angle of each conical surface being smaller than the apex angle of its associated element; means for limiting movement of each element outwardly of its associated seat; a discharge passage communicating with the larger end of the conical surface of said first valve seat; and a suction duct for immersion in said fluid communicating with the smaller end of the conical surface of said second valve seat.

References Cited by the Examiner

UNITED STATES PATENTS 2,362,080  11/1944  Martin _____ 222—231
2,657,834  11/1953  Bacheller _____ 222—321

LOUIS J. DEMBO, *Primary Examiner.*